(No Model.)

F. F. WARD.
FISHERMAN'S MINNOW BOAT.

No. 336,967. Patented Mar. 2, 1886.

Witnesses.
John C. Perkins
Ralph Littler

Inventor:
Frank F. Ward
By Lucius C. West.
atty.

UNITED STATES PATENT OFFICE.

FRANK F. WARD, OF OTSEGO, MICHIGAN, ASSIGNOR OF ONE-HALF TO C. D. STUART, OF SAME PLACE.

FISHERMAN'S MINNOW-BOAT.

SPECIFICATION forming part of Letters Patent No. 336,967, dated March 2, 1886.

Application filed October 10, 1885. Serial No. 179,518. (No model.)

*To all whom it may concern:*

Be it known that I, FRANK F. WARD, a citizen of the United States, residing at Otsego, in the county of Allegan and State of Michigan, have invented a new and useful Improvement in Fishermen's Minnow-Boats, of which the following is a specification.

This invention has for its object the construction of a device for containing minnows, which device is adapted to float in the water, substantially as below described and claimed.

Figure 1:
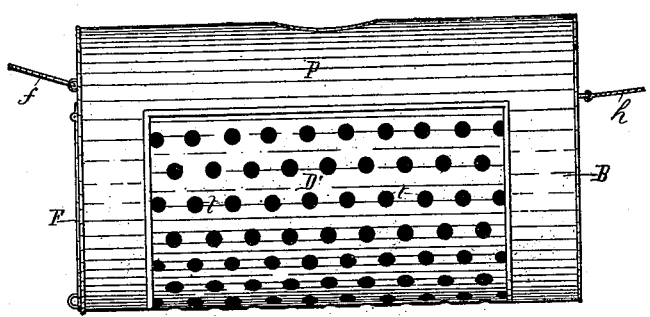
Figure 2:
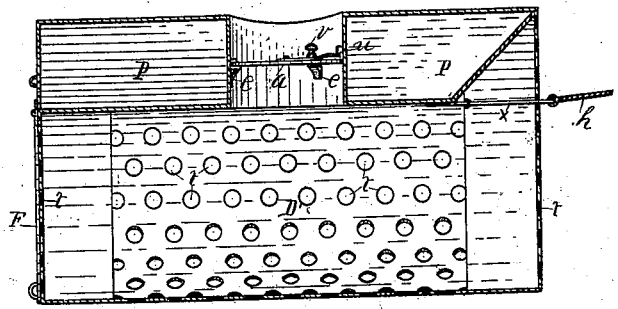
Figure 3:
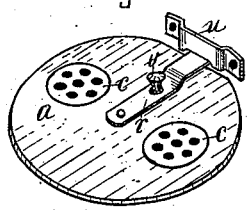

In the drawings forming a part of this specification, Figure 1 is a side elevation; Fig. 2, a vertical longitudinal section; and Fig. 3 is an enlarged perspective view of a detail in Fig. 2, referred to by like letters.

Referring to the drawings and the reference-letters marked thereon, B is the boat, having in the upper part an air-chamber, P, which causes the boat to float on the water. The minnow-chamber of the boat is below the air-chamber, and the walls or inclosure are provided with perforations $i$, to admit the water, so that the minnows will be in the water when the boat floats in the position shown in Fig. 1, the perforated portion containing the minnows being then under water.

If desired, the boat may be placed in a pail of water, on its end, when not using it as a boat, in which case access is had to the minnows through the end door, F, Fig. 1. One end wall of the air-chamber P may be made slanting or at an oblique angle to a vertical line, as in Fig. 2, in which case the boat, in being drawn through the water with this slanting end foremost, will not draw as much water as it would if the end were blunt or square, like the other end; but this construction is a matter of choice. The air-chamber P has a vertical walled-up entrance-opening through it, provided with a detachable door, $a$. The perforations $c\,c$ through admit air into the minnows' chamber. By detaching the door minnows may be taken out or placed in. The door $a$ is supported on lugs $e$, projecting from the wall of the entrance-opening, one of which lugs is recessed to receive the side of the door opposite to the latch $h$. This latch is made of elastic metal, so as to spring and enter the catch $u$ when said latch is swung on its pivotal connection with the door. The elasticity of the latch holds it in the catch until it is sprung down to unlatch it. The side of the door is cut away to clear the catch $u$, when putting the door in place or taking it out; but the details of this door and manner of detachably securing it in the entrance-opening are matters of choice. The bail $f$ is to lift or carry the boat by. A rope or chain to haul the boat by is shown at $h$, jointedly connected to the boat by means of hook $x$.

Having thus described my invention, what I claim as new, and desire to secure by Letters Patent, is—

1. A minnow-boat consisting of an air-chamber to float on the water, a connected perforated minnow-chamber below, and a walled-up entrance-opening leading down through the air-chamber into the minnow-chamber, substantially as set forth.

2. A minnow-boat consisting of an air-chamber having its end wall at the forward end of the boat slanted, as specified, and a perforated minnow-chamber below the air-chamber and connected therewith, said air-chamber having a walled-up entrance-opening leading down through it into the minnow-chamber, substantially as set forth.

3. A minnow-boat consisting of an air-chamber, a connected perforated minnow-chamber below, a walled-up entrance-opening down through the air-chamber, and a detachable door in said opening, substantially as set forth.

In testimony of the foregoing I have hereunto subscribed my name in presence of two witnesses.

FRANK F. WARD.

Witnesses:
E. S. RANKIN,
C. F. RUSSELL.